United States Patent [19]

Sturza

[11] Patent Number: 4,706,286

[45] Date of Patent: Nov. 10, 1987

[54] METHOD AND CIRCUIT FOR EXTRACTION OF DOPPLER INFORMATION FROM A PSEUDO-NOISE MODULATED CARRIER

[75] Inventor: Mark A. Sturza, Woodland Hills, Calif.

[73] Assignee: Litton Systems, Inc., Beverly Hills, Calif.

[21] Appl. No.: 869,823

[22] Filed: May 30, 1986

Related U.S. Application Data

[63] Continuation of Ser. No. 567,338, Dec. 30, 1983.

[51] Int. Cl.$^4$ .............................................. H04L 9/00
[52] U.S. Cl. ...................................... 380/34; 380/46; 375/1.0
[58] Field of Search ............... 342/107, 111, 115, 195, 342/196; 380/34, 40, 46; 375/1.0, 115; 455/260, 209

[56] References Cited

U.S. PATENT DOCUMENTS

| | | | |
|---|---|---|---|
| 3,906,204 | 9/1975 | Rigdon et al. | 364/200 |
| 4,119,926 | 10/1978 | Frosch et al. | 375/115 |
| 4,221,005 | 9/1980 | LaFlame | 375/115 |
| 4,285,060 | 8/1981 | Cobb et al. | 375/1 |
| 4,490,829 | 12/1984 | Van Etten | 375/1 |

FOREIGN PATENT DOCUMENTS 2120489B 2/1986 United Kingdom .

OTHER PUBLICATIONS

"The Origins of Spread-Spectrum Communications" by Robert A. Scholtz, vol. COM-30, #5, May 1982, IEE Trans. on Comm.

Primary Examiner—Salvatore Cangialosi
Assistant Examiner—Aaron J. Lewis
Attorney, Agent, or Firm—Edmund W. Rusche; Elliott N. Kramsky

[57] ABSTRACT

A method and apparatus for detecting and identifying Doppler frequency and phase information contained within a signal of the direct sequence spread spectrum type. An incoming signal is split by a circuit and component parts mixed with first and second local oscillator signals, the frequency of the first local oscillator being less than that of the carrier and the second being greater than that of the carrier by the same amount, plus an amount equal to twice the maximum Doppler frequency shift. The heterodyned signals are then low pass filtered, mixed with each other to form a heterodyned output that is then low pass filtered. The resultant signal retains Doppler phase and frequency information and is independent of carrier frequency and modulating PN-code thereby providing an easily demodulated signal whose Doppler information may be readily identified.

7 Claims, 1 Drawing Figure

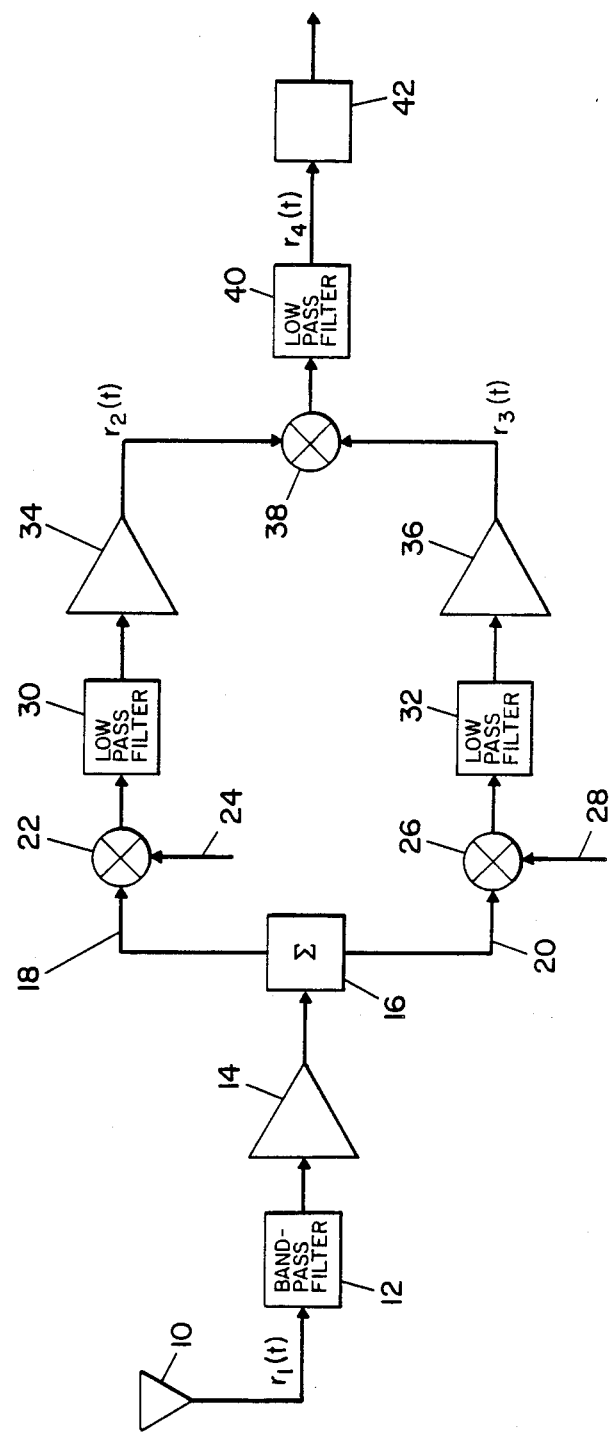

METHOD AND CIRCUIT FOR EXTRACTION OF DOPPLER INFORMATION FROM A PSEUDO-NOISE MODULATED CARRIER

This application is a continuation of application Ser. No. 567,338, filed Dec. 30, 1983.

BACKGROUND OF THE INVENTION

1. Field of the Invention

The present invention relates to a circuit and method for extracting preselected information from a signal. More particularly, this invention pertains to such method and circuit for extracting the Doppler frequency and phase from a pseudo-noise modulated carrier without a priori knowledge of the modulating code.

2. Description of the Prior Art

The use of a pseudo random bit sequence to modulate a free space signal has acquired significance in the communication arts with many important applications, both military and civilian, either in effect or foreseen. By utilizng such a sequence, often referred to as a pseudo-noise code (PN-code), one may create a modulated sinusoidal carrier of the type known as a direct sequence spread spectrum signal. In such a signal, more of the bandwidth is occupied than is required for transmission. As such, one may attain a number of advantageous characteristics including (1) hiding of signal (2) inherent anti-jam performance resulting from the spreading of signal power (3) transmission of ranging information, (4) lessened sensitivity to signal path anomalies and (5) code division multiple access (CDMA) allowing the transmission of many signals in the same frequency band without interference.

The above-described characteristics of direct sequence spread spectrum signal transmission have proven advantageous in battlefield environments, oil exploration and satellite-aided radio navigation. A prominent application is found in the currently contemplated Global Positioning System ("GPS"), a worldwide network of earth satellite/transmitters that will allow users to fix or determine their locations with respect to known satellite locations. Each of such satellites will transmit a carrier modulated with an identifying pseudo-noise sequence assigned to the satellite. User location with respect to each satellite is determined from Doppler phase and frequency shift information and actual location then determined through survey methods such as triangulation.

In the prior art, the extraction of the Doppler information has required the identification of the modulating pseudo-noise code (PN-code). This greatly complicates the detection process. For example, many direct sequence spread spectrum systems take advantage of the low cross correlation between PN-codes to utilize simultaneous operation of many transmitters at the same carrier frequency, the CDMA technique. This has required, in actual implementation, multiple receiver channels in addition to knowledge of the PN-codes.

SUMMARY OF THE INVENTION

The present invention addresses and overcomes the above referenced disadvantages of the prior art by providing, in a first aspect, a method for extracting the Doppler frequency and phase from a direct sequence spread spectrum signal of the type that includes a sinusoidal carrier modulated by a psuedo-noise sequence. This method includes splitting such signal into first and second signals, each having the same frequency, phase and amplitude as the original signal. Then, the first signal is mixed with a first local oscillator to provide a first heterodyned signal, the frequency of such first local oscillator being less than that of the carrier. The second signal is mixed with a second local oscillator to provide a second heterodyned signal, the frequency such second local oscillator being greater than the frequency of the carrier signal. Then, the sum signals are filtered from the first and second heterodyned signals to provide first and second difference signals. The first and second difference signals are then mixed to provide a heterodyned output signal then the sum signal is filtered from the heterodyned output signal to provide an output difference signal.

In another aspect of this invention, there is provided apparatus for extracting Doppler frequency and phase from a signal of the direct sequence spread spectrum type. Such apparatus includes means for detecting the signal and means for splitting the signal into first and second signals, each having the amplitude, phase and frequency of such signal. A first channel is provided for accepting the first signal and a second channel is provided for accepting the second signal. The first channel includes means for transforming the frequency of the first signal and the second channel includes means for transforming the frequency of the second signal to a value that is offset from that of the output of the first channel. Means are further provided for mixing the outputs of the first and second channels.

The foregoing and additional features and advantages of the present invention will become further apparent from the detailed description that follows. This description is accompanied by a drawing figure to further enhance the description. In the drawing, reference numerals, alluded to in the written description, point out various aspects of the invention, like numerals referring to like features of the invention throughout both the illustration and the written description.

BRIEF DESCRIPTION OF THE DRAWINGS

The FIGURE is a schematic diagram of an electrical circuit for extraction of Doppler frequency and phase from a PN-code modulated carrier signal in accordance with the invention.

DETAILED DESCRIPTION

Referring now to the drawing, the FIGURE presents a schematic diagram of a preferred electrical circuit for practicing the present invention. The circuit is arranged to perform a unique signal processing sequence for demodulating an incoming direct sequence spread spectrum signal. As will be seen, both the PN-code modulation and the carrier frequency are extracted from the desired Doppler frequency and phase information as the modulated signal passes through the circuit without a priori knowledge of the code at the receiver. This results in a demodulation and detection process that requires substantially less hardware than conventional receivers. Further, the circuit is capable of performing like demodulation of a plurality of incoming signals of the direct sequency spread spectrum type to thereby take advantage of the absence of correlation among PN-code modulated signals.

The circuit includes an antenna 10 for detecting the modulated signal and converting it from free space propagation to an electrical signal. The electrical signal is then applied to a bandpass filter 12. The filter 12 is preferably of bandwidth equal to twice the chipping rate of the modulating PN-code. By setting the bandpass thusly, interfering signal noise is removed without loss of a significant amount of signal power.

The signal is then directed to an amplifier 14 prior to application to a 3 dB splitter 16 that is arranged to provide matched outputs along circuit paths 18 and 20. A mixer 22 within the circuit path 18 accepts a first local oscillator signal 24 while a mixer 26 within circuit path 20 accepts a second local oscillator signal 28. The frequencies of the local oscillator signals 24 and 28 are less than that of the carrier and greater than the carrier by a preselected amount, respectively. In the latter instance, the carrier frequency is exceeded by twice the maximum Doppler frequency shift, $f_d$. Mathematically, this may be expressed as follows:

$$f_{28} = f_{RF} + f_{IF} + \delta,$$

$$\delta = 2 \times \frac{|V_{MAX}|}{c} \times f_{RF}$$

Where:
$f_{RF}$ = carrier frequency;
$f_{IF}$ = intermediate frequency;
$\delta$ = frequency offset;
$V_{MAX}$ = maximum relative velocity between receiver and transmitter; and
$c$ = speed of light.

The invention may be utilized to extract desired information from direct sequence spread spectrum signals that utilize an unknown PN-code to modulate a carrier signal of known frequency. In the GPS navigation system referenced above, for example, each satellite transmitter provides navigation signals at both 1575.42 MHz and 1227.6 MHz that are modulated, or "spread" by a code of either or both of the C/A or P types. C/A codes are members of the Gold code famity having a chipping rate of 1.023 MBPS while P codes are one week segments of a very long pseudo-noise sequence and have a chipping rate of 10.23 MBPS. It is anticipated that, when the GPS satellite constellation is fully deployed, four to nine satellites will be visible from any point on Earth. As mentioned, by means of the present invention it will be possible to extract Doppler frequency and phase for all satellites in view simultaneously.

Returning to discussion of the Figure, the outputs of the mixers 22 and 26 are filtered by means of the low pass filters 30 and 32 respectively. As such, the "sum" frequency of each mixed output is removed. Further, as a consequence of the selection of the frequency of the second local oscillator signal, the difference frequency is "folded over" in the frequency domain. As will be seen, the filtered outputs of the mixers 22 and 26 are later mixed or heterodyned together to form a signal absent modulation information and without ambiguity with regard to the sense of the Doppler frequenmcy shift information.

The mixer outputs are applied to amplifiers 34 and 36, then heterodyned together by means of a mixer 38. The output of the mixer 38 is filtered of the sum frequency component by means of a low pass filter 40 and the output of this filter is then applied to a digital computer 42 that has been programmed to compute the Fast Fourier Transform of the signal applied thereto, thereby identifying the Doppler information by transforming the output signal to the frequency domain. As an alternative to the use of a digital computer 42, one might utilize a digital special purpose chip comprising a bank of bandpass filters followed by phase tracking loops.

The function and process of the present will become further apparent as one follows the signal transformations that occur as a direct sequence spread spectrum signal travels through the circuit. Such signal is of the following form:

$$r_1(t) = \sqrt{2S}\ P(t - \tau)\cos(2\pi f_{RF} t + 2\pi f_d t + \theta)$$

Where
$P(t-\tau)$ = time domain representation of PN-code
$f_d$ = Doppler frequency shift
$\theta$ = Doppler phase After splitting the signal, then passing it through the mixer 22 followed by the low pass filter 30, a first heterodyned signal of the following form is generated through interaction with the first local oscillator signal;

$$r_2(t) = G\sqrt{2S}\ P(t - \tau)\cos(2\pi f_{IF} t + 2\pi f_d t + \theta)$$

Similarly, the other portion of the split signal, after passing through the mixer 26 and the low pass filter 32 creates a second heterodyned signal of the following form:

$$r_3(t) = G\sqrt{2S}\ P(t - \tau)\cos(2\pi f_{IF} t + 2\pi \delta t - 2\pi f_d t - \theta)$$

The expression for the frequency of $r_3(t)$ is actually reversed in sign as a result of the phenomenon known as frequency foldover that occurs in any physically realizable system. This results from the inclusion of a frequency offset $\delta$, equal to twice the maximum Doppler shift, $f_d$, in the frequency of the second local oscillator signal 28. As a result of the magnitude of this frequency offset, the expression for the heterodyned difference frequency results in a negative value causing the foldover to occur.

The signal emerging from the low pass filter 40, representing the difference component of the heterodyned output of the mixer 38, is of the following form:

$$r_4(t) = G^2 S \cos(2\pi\delta t + 2\pi(2f_d)t + 2\theta)$$

The PN-code term drops out of $r_4(t)$ since $P^2(t-\tau)$, a function performed by the mixing of $r_2(t)$, is equal to one.

The frequency of this signal includes, as components, the predetermined offset $\delta$, and the Doppler quantities, frequency ($f_d$) and phase ($\theta$). The frequency of the $r_4(t)$ signal, which is to be applied to the digital computer 42 for identification of the Doppler quantities is also unambiguous in the sense that it is always positive. This is due to the presence of the frequency offset (equal to twice the maximum $f_d$) in the frequency expression. That is, the (positive) frequency of this output signal can never be due to the folding over of an otherwise-negative value. Hence, by taking into account the known offset, the Doppler frequency shift, $f_d$, can be determined without doubts as to its sign. This is extremely significant as the sign of the Doppler shift distinguishes a relative approach velocity from a separation velocity.

The outputs of the mixers 22 and 26 are preferably low pass filtered with bandwidths lying in the range between twice the intermediate frequency and the sum of intermediate frequency and code chipping rate. The output of the mixer 38 is preferably low pass filtered with a one sided bandwidth equal to twice the frequency offset $\delta$.

The output $r_4(t)$ of the low pass filter 40 contains a spectral line at twice the Doppler frequency with twice the phase. As mentioned, the Doppler frequency and phase may then be extracted by utilizng Fourier transform techniques, implemented either with a digital computer 42 or dedicated special purpose circuitry. In the event that multiple transmitters are visible to the receiver antenna 10, the output of the filter 40 will contain spectral lines at twice the Doppler frequency with twice the phase of each of the received signals.

Thus it is seen that there has been provided to the communications art a new and improved method and circuitry for extracting and identifying the Doppler information contained in a signal of the direct sequence spread spectrum type. By utilizing the methods and apparatus of the invention, one is able to detect and identify the important Doppler frequency and phase parameters without knowledge of the PN-code of the transmitter and without any requirement that receiver and transmitter be synchronized in time as has been necessitated by the prior art.

While the invention has been described with reference to its presently preferred embodiment, it is not intended to be so limited in scope. Rather, the scope of this invention extends to that described in the following set of claims and all equivalents thereof.

What is claimed is:

1. A method for extracting the Doppler frequency and phase from a direct sequence spread spectrum signal of the type that include a sinusoidal carrier modulated by a psuedo-noise sequence, said method comprising the steps of:
    (a) splitting said signal equally into first and second signals; then
    (b) mixing said first signal with a first local oscillator to provide a first heterodyned signal, the frequency of said first local oscillator being less than the frequency of said carrier signal; and
    (c) mixing said second signal with a second local oscillator to provide a second heterodyned signal, the frequency of said second local oscillator exceeding the frequency of said carrier signal by twice the maximum Doppler frequency shift; then
    (d) filtering the sum signals from said first and second heterodyned signals to provide a first difference signal and a second difference signal; then
    (e) mixing said first and second difference signals to provide a heterodyned output signal; then
    (f) filtering the sum signal from said heterodyned output signal.

2. A method as defined in claim 1 additionally including the step of taking the Fourier transform of said output difference signal to identify Doppler frequency and phase.

3. A method as defined in claim 2 further comprising the step of filtering said direct sequency spread spectrum signal to pass a bandwidth equal to twice the chipping rate of said signal.

4. Apparatus for extracting Doppler frequency and phase from a signal of the direct sequence spread spectrum type that includes a sinusoidal carrier modulated by a pseudo-noise sequence comprising, in combination:
    (a) means for detecting said signal;
    (b) means for splitting said signal into first and second signals;
    (c) a first channel for said first signal;
    (d) a second channel for said second signal;
    (e) said first channel including means for mixing said first signal with a first local oscillator;
    (f) said second channel including means for mixing said second signal with a second local oscillator;
    (g) the frequency of said first local oscillator being less than the frequency of said carrier signal;
    (h) the frequency of said second local oscillator exceeding the frequency of said carrier signal by twice the maximum Doppler frequency shift; and
    (i) means for mixing the outputs of said first and second channels.

5. Apparatus as defined in claim 4 further comprising means for transforming the output of said last-named means to the frequency domain for identifying the frequency and phase thereof.

6. Apparatus as defined in claim 5 further characterized in that:
    (a) said first channel includes a low pass filter arranged to accept the output thereof; and
    (b) said second channel includes a low pass filter arranged to accept the output thereof.

7. Apparatus as defined in claim 6 further including a low pass filter arranged to accept the output of said means for mixing the outputs of said first and second channels.

* * * * *